United States Patent Office 2,789,019
Patented Apr. 16, 1957

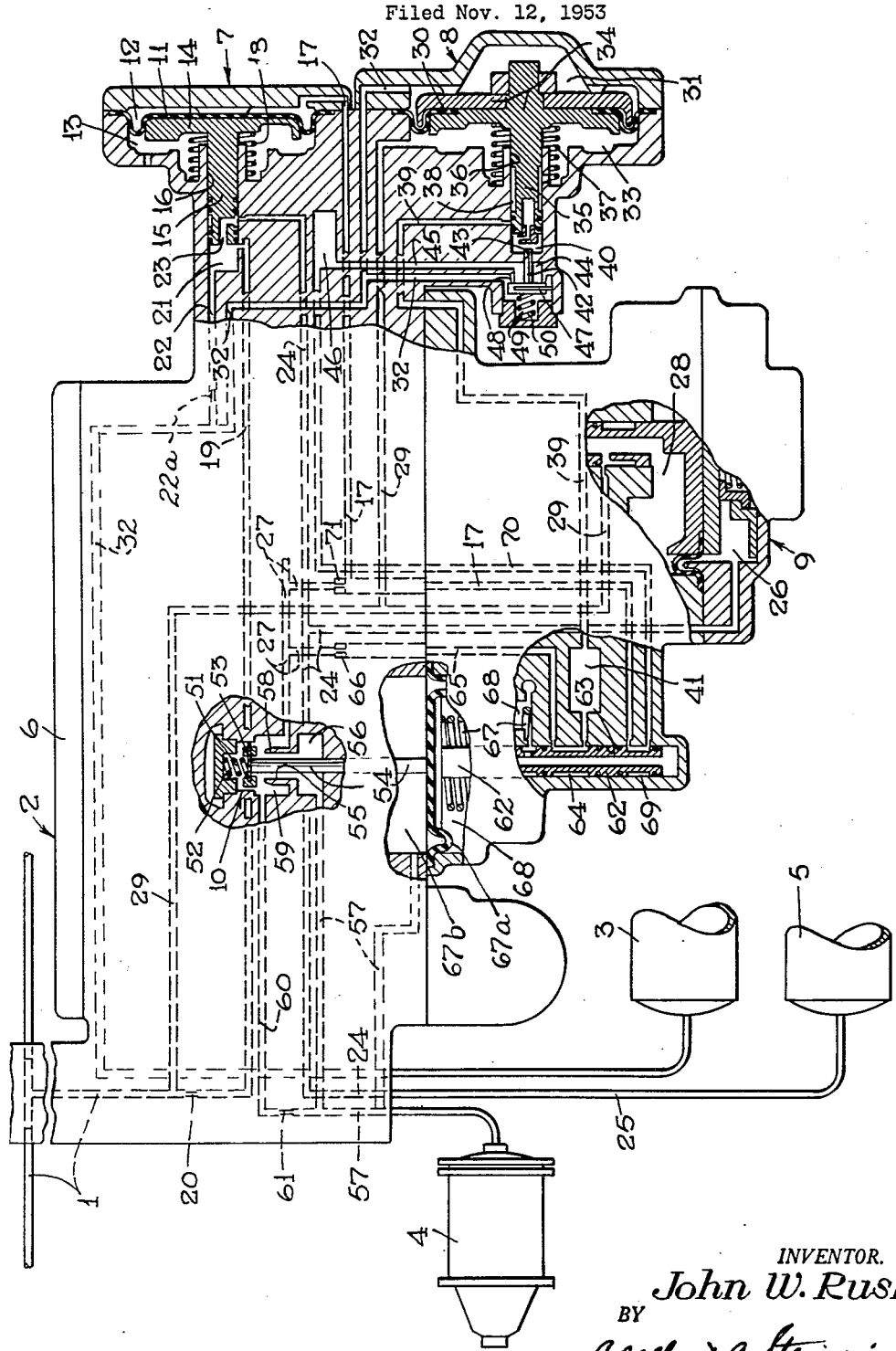
INVENTOR.
John W. Rush
BY
Adelbert A. Steinmeier
ATTORNEY

2,789,019

FLUID PRESSURE BRAKE APPARATUS

John W. Rush, Wilkinsburg, Pa., assignor to Westinghouse Air Brake Company, Wilmerding, Pa., a corporation of Pennsylvania Application November 12, 1953, Serial No. 391,503

11 Claims. (Cl. 303—60)

This invention relates to fluid pressure brake apparatus and more particularly to the type adapted for use on trains in European service, in which the degree of brake application is controlled according to the extent of reduction in pressure of fluid in a brake pipe below that in a control reservoir.

In the co-pending application of Glenn T. McClure, Serial No. 388,189, filed October 26, 1953, there is shown and described an apparatus of the above type, comprising on each brake-equipped car a so-called charging valve device which, when a certain chamber is devoid of fluid under pressure, is adapted to assume a charging position for locally connecting the brake pipe to the control reservoir and a corresponding auxiliary reservoir for respectively equalizing control reservoir pressure with brake pipe pressure and charging the auxiliary reservoir to brake pipe pressure; said charging valve device being operative, upon supply of fluid under pressure to said certain chamber during a brake application, to assume a cut-off position for terminating such local connection and bottling up fluid at a datum pressure in the control reservoir.

This apparatus is adapted for use with an engineer's automatic brake valve device which may be of the type comprising, briefly, valve means operable by movement of a handle to a release position for charging the brake pipe with fluid at a relatively high pressure (which may be 110 p. s. i.) for effecting a uniform, rapid release of the brakes throughout the train; to a running position for maintaining the brake pipe charged with fluid at a normal operating pressure (which may be 70 p. s. i.), and in which position the brakes are released at a slower rate and/or are maintained released; to a service position for causing any desired degree of service reduction in pressure in said brake pipe below normal operating pressure according to the length of time said handle is maintained in such position, for causing a corresponding degree of brake application; to a lap position for bottling up fluid in said brake pipe at the desired reduced pressure; and to an emergency position for venting fluid under pressure from the brake pipe to atmosphere at a rapid rate for effecting an emergency application of the brakes.

Hence, if the charging valve device moves to charging position at a time when the handle of the automatic brake valve device is in release position, fluid at high pressure in the brake pipe will flow into, and cause overcharging of, the control and auxiliary reservoirs beyond their proper pressures; namely, brake pipe normal operating pressure. Since a relatively small reduction in brake pipe pressure below the datum pressure in the control reservoir will cause a brake application, it will be apparent that if upon a release of brakes said reservoir is overcharged in the above manner an undesired reapplication of brakes will occur when brake pipe pressure is reduced to normal operating value by movement of the aforementioned handle to running position; and, moreover, as will be noted from a study of the aforementioned copending application, any such excessive control reservoir pressure can never be released.

In practice, therefore, in order to avoid overcharging the control reservoir during a release of a brake application and yet rapidly and uniformly initiate a brake release throughout the train, the engineer has heretofore maintained the aforementioned handle in release position for a safe, limited period of time during which brake cylinder pressure and then reduced brake pipe pressure, hitherto bottled up in a quick service volume on each brake-equipped car, may be successively relied upon to maintain the charging valve device in cut-off position; such period of time being determined in part by the rate of blow-down of both such pressures to atmosphere through a compromise choke, the flow capacity of which is also determined by other, conflicting requirements. Thus, before such blow-down causes the charging valve device to move to charging position, the engineer must move the aforementioned handle to running position, even through the brake release may not have been completed throughout the train. Such procedure necessarily prevents complete utilization of the release position of the automatic brake valve device and, especially in the case of long trains or those having many brake-equipped cars, curtails the rapidity and uniformity of brake release throughout the train.

It is therefore one object of this invention to provide an improved fluid pressure brake apparatus of the above type which enables the automatic brake valve device handle to be safely maintained in release position until the brakes are completely released through the train.

According to this object, novel means are provided for not only causing the charging valve device to move to cut-off position more promptly after initiation of a brake application but for also maintaining said device in such position for any desired minimum period of time after initiation of a brake release. The novel means comprises a storage volume chargeable, during a brake application, with fluid under pressure from the auxiliary reservoir and further comprises an additional choke which may be of any selected flow capacity for cooperation with said volume to so control the rate of venting of the aforementioned chamber of the charging valve device during the final phase of a brake release as to maintain said device in cut-off position for a preselected period of time.

Another object of this invention is to provide an improved apparatus of the above type in which quick service reduction in local brake pipe pressure (hereinafter to be explained) may be accomplished at an optimum rate, unaffected by other considerations.

Another object is to provide an improved brake apparatus of the above type in which, during an emergency rate of reduction in brake pipe pressure to atmospheric pressure, the possibility is eliminated of an undesired reduction in pressures of fluid in the control and auxiliary reservoirs by way of the vented brake pipe. In the previous structure there was a possibility that during an emergency application of the brakes, brake pipe pressure in the quick service volume and hence in the chamber of the charging valve device, after initially causing said device to move to cut-off position, might subsequently be reduced to atmosphere at such a rapid rate that said device will return to charging position before an inshot valve device terminates communication of said volume with said chamber.

Other objects and advantages will become apparent from the following more detailed description of the invention and from the accompanying drawing wherein the single figure is a diagrammatic view of that portion of the fluid pressure brake apparatus embodying the invention.

*Description*

Since the novel structure is adapted for use with fluid pressure brake apparatus which may, for sake of illustration, be of the type shown and described in the aforementioned copending application, the disclosure in the accompanying drawing and in the following description has been limited to only such structure as is essential to a clear understanding of the present invention.

Referring to the drawing, the brake apparatus comprises the usual brake pipe 1 which is adapted to extend through the train and to be charged with fluid at a pressure controlled in well-known manner by manual operation of the engineer's automatic brake valve device on the locomotive, for thereby controlling application and release of the brakes on the connected cars of the train.

On each brake-equipped car of the train is provided a brake controlling valve device 2 adapted to respond to a chosen reduction in pressure of fluid in the brake pipe 1 for controlling supply of fluid under pressure from an auxiliary reservoir 3 to a brake cylinder device 4 for effecting a corresponding degree of brake application on such car; said brake controlling valve device being adapted to respond to charging of said brake pipe to release fluid under pressure from said brake cylinder device, charge said auxiliary reservoir with fluid under pressure from said brake pipe, and equalize the pressure of fluid in a control reservoir 5 with that in said brake pipe, as will be explained more fully in subsequent description.

The brake controlling valve device 2 comprises a combination pipe bracket and sectionalized casing, designated generally by the reference numeral 6, to which bracket the brake pipe 1, auxiliary reservoir 3, brake cylinder device 4 and control reservoir 5 are adapted to be connected. The brake controlling valve device 2 also comprises a charging valve device 7, a quick service valve device 8, a graduated control portion or service valve device 9, and an inshot valve device 10, all of which devices are formed within, and in part defined by, the various sections of casing 6.

The charging valve device 7, which may be identical with that shown in the aforementioned copending application, comprises a flexible diaphragm 11, suitably clamped at its outer periphery between adjacent casing sections and separating a pressure chamber 12 from a non-pressure chamber 13 open to atmosphere. The diaphragm 11 is operatively connected to a diaphragm follower 14 having an integrally formed combination follower stem and valve 15 which extends through the non-pressure chamber 13 and has slidable, sealing engagement with the wall of a coaxially aligned bore 16 provided in casing 6. The pressure chamber 12 is adapted to be charged with fluid under pressure or vented to atmosphere by way of a passage 17 in casing 6.

When chamber 12 of charging valve device 7 is devoid of fluid under pressure, a light spring 18 disposed in chamber 13 and acting on follower 14 is adapted to urge the diaphragm 11 and combination stem and valve 15 into one position in which the projecting end of said valve uncovers a passage 19 open to the brake pipe 1 through the usual choke 20, for causing fluid under pressure to flow from said brake pipe at a rate controlled by said choke, through said passage and thence through a chamber 21 adjacent the base of bore 16, to a passage 22 in casing 6, and thence, by way of a choke 22a and a passage 32, to the auxiliary reservoir 3; such position of valve 15 defining a charging position of the device 7. With charging valve device 7 in charging position, a suitable passage 23 formed in the combination stem and valve 15 effects registry between chamber 21 and a passage 24 in casing 6, one branch of which passage leads to the control reservoir 5 via a pipe 25, and another branch of which leads to a control chamber 26 in the service valve device 9, for thereby causing equalization of pressures in said control reservoir and in said chamber 26 with local brake pipe pressure.

Upon supply of fluid under pressure to chamber 12 of charging valve device 7, the diaphragm 11 is adapted to deflect against resistance of spring 18 and advance the valve 15 to another position (hereinafter referred to as the cut-off position of the charging valve device 7) in which valve 15 closes off communication of the passages 19, 22 and 24 with each other, thereby bottling up fluid under pressure in the control reservoir 3 and in the control chamber 26 of service valve device 9.

The service valve device 9, which may be identical with that described in the aforementioned copending application, comprises valve means (not shown) normally so biased as to cause said device to assume a release position for venting the brake cylinder device 4 to atmosphere through intervening communication (to be described) including a passage 27; said service valve device being adapted to assume an application position upon a sufficient reduction in pressure in a chamber 28, that is open to the brake pipe 1 via a passage 29, relative to control reservoir pressure in chamber 26 for successively terminating venting of passage 27 (and thus of brake cylinder device 4) and then causing supply of fluid under pressure from the auxiliary reservoir 3 to said brake cylinder device via the latter passage and said intervening communication; said service valve device being adapted to assume an intermediate or lap position, in which fluid under pressure in said brake cylinder device and passage 27 is bottled up, when the combined effects of a bias spring (not shown) and reduced pressure in chamber 28 and increasing pressure in a certain chamber (not shown, but open to the brake cylinder device 4 by way of passage 27) are substantially equal to the effect of datum pressure in the control chamber 26. Upon an increase in pressure in the brake pipe 1 and hence in chamber 28, the service valve device 9 is adapted to return to release position.

According to the invention, the structure of the quick service valve device 8 and inshot valve device 10 is modified relative to that shown in the aforementioned copending application, and the chamber 12 of charging valve device 7 is charged in a novel manner, as will be demonstrated presently.

As in the structure shown in the aforementioned copending application, the quick service valve device 8 comprises a flexible diaphragm 30 clamped adjacent its outer periphery between two sections of casing 6 with which said diaphragm cooperates to define, on one side of said diaphragm, a chamber 31 constantly open to a branch of the passage 32 which is in communication with the auxiliary reservoir 3; and defining on the opposite side of said diaphragm, a chamber 33 constantly open to the brake pipe1 by way of a branch of passage 29. Adjacent its inner periphery the diaphragm 30 is suitably clamped between portions of a follower 34 for controlling movement of a combination follower stem and valve 35 which is formed integrally with one of said follower portions and slidably guided in a coaxially aligned bore 36 open at one end to chamber 33. A light spring 37, suitably arranged in chamber 33 and acting on follower 34, urges the diaphragm 30 and valve 35 to one position when auxiliary reservoir pressure in chamber 31 is substantially equal to local brake pipe pressure in chamber 33, for thereby defining a normal position of the quick service valve device 8. In such position, a cavity 38, formed in part by a reduced diameter portion of stem 35, is constantly open through the wall of bore 36 to the chamber 33, but is out of registry with a passage 39 formed in casing 6; said cavity being open, however, to a chamber 40 formed between the projecting end of stem 35 and the base of bore 36 so that brake pipe pressure and auxiliary reservoir pressure will act, opposingly, on equal effective areas of the diaphragm 30.

Upon a slight reduction in brake pipe pressure and hence in pressure in chamber 33, the auxiliary reservoir pressure in chamber 31 is operative to cause deflection of diaphragm 30 against resistance of spring 37 and thus cause the valve 35 to assume another position, for defining a quick service position of the quick service valve device 8. In such position, fluid under pressure from the brake pipe 1 will flow via passage 29, chamber 33 and cavity 38 to the passage 39 and thence to a so-called quick service volume 41, provided in casing 6 for causing a rapid local reduction in brake pipe pressure, for reasons to be explained in subsequent description of operation.

According to a feature of the invention, the end of the combination stem and valve 35 adjacent chamber 40 is adapted for operative abutting engagement with a plunger 42 slidably guided in and normally projecting exteriorly of a bore 43, substantially smaller than bore 36 and extending coaxially with the latter bore through casing 6 to a chamber 44 which is constantly open, by way of a passage 45, to a volume 46 in said casing.

The plunger 42 extends through chamber 44 and is operatively attached to one side of a valve 47, which may be disc-shaped and seatable against an annular seat rib 48 formed by a projecting portion of casing 6 encircling the end of chamber 44 opposite bore 43. At the opposite side of valve 47 is a chamber 49 constantly open to a branch of the passage 32 which is constantly charged with fluid under pressure from the auxiliary reservoir 3.

When the quick service valve device 8 is in normal position, the projecting end of the combination follower stem and valve 35 is out of engagement with the plunger 42, and the valve 47 is consequently seated by action of a spring 50 disposed in chamber 49, for thereby preventing communication between the chambers 44, 49. When, however, the quick service valve device 8 is in quick service position, the projecting end of stem 35 abuts the base of bore 36 and depresses the plunger 42, thereby holding valve 47 unseated against resistance of spring 50 and consequently causing fluid under pressure to flow from the auxiliary reservoir 3 by way of passage 32 and chamber 49, past unseated valve 47 to chamber 44 and thence via passage 45 to the volume 46. It should be noted that the local reduction in pressure in passage 32, and hence in chamber 31, resultant from such flow will not cause undesired temporary or shuttling movement of the quick service valve device 8 to normal position because a local reduction in brake pipe pressure in chamber 33 is also being effected at the same time by rapid charging of the quick service volume 41, which will remain vented to atmosphere by way of the service valve device 9 until the latter device moves from release position, as will be brought out in subsequent description of operation.

The inshot valve device 10 may be identical with that described in the aforementioned copending application except insofar as hereinafter specifically noted. As in the previous structure, device 10 is adapted to provide rapid inshot of fluid under pressure to the brake cylinder device 4 for rapidly taking up slack in the brake rigging until brake cylinder pressure attains a certain preselected low value; whereupon said inshot valve device is operative to cause a reduction in the rate at which said brake cylinder device is subsequently charged. As heretofore, the device 10 comprises a spring 51 arranged in a chamber 52 in casing 6 and acting on an inshot valve 53 (which may be disc-shaped) to tend to maintain said valve in abutting contact with a cylindrical pusher stem 54 projecting centrally with substantial clearance through a bore 55 in casing 6 so as to define, in part, a chamber 56 which is constantly open to a passage 57 leading to the brake cylinder device 4. A tapered, annular valve seat rib 58 is formed by a projecting portion of casing 6 in encirclement of the upper end of bore 55 to accommodate seating engagement of the inshot valve 53; and encircling said seat rib is a chamber 59 which is constantly open to chamber 52, to passage 27 and to a passage 60 which, in turn, is open through the usual choke 61 to the passage 57. The inshot valve device 10 further comprises a combination follower stem and valve 62 slidably mounted in a bore 63 in casing 6 and having an annular cavity 64 which is adapted to control fluid pressure connection of the quick service volume 41 to a passage 65 which, through a choke 66, is open to a branch of the passage 27. Operation of the pusher stem 54 and combination follower stem and valve 62 may for sake of illustration and for purposes of simplified showing, be controlled by the relative, opposing effects on a flexible diaphragm 67a of brake cylinder pressure in a control chamber 67b, that is constantly open to a branch of passage 57, and action of a bias spring 67 that is disposed in an atmospheric chamber 68; said diaphragm being interposed between said pusher stem 54 and combination follower stem and valve 62. If preferred, however, operation of the pusher stem 54 and the combination follower stem and valve 62 may be controlled by structure of the type disclosed in the aforementioned copending application, without affecting the basic purpose of the present invention.

According to a feature of the invention, the combination follower stem and valve 62 and the bore 63 are lengthened, said stem being provided with an annular cavity 69 for controlling fluid pressure communication between the passage 17 and a passage 70 constantly open to the volume 46; the passage 17 being open through a choke 71 to a branch of passage 27, for reasons to be described presently.

In operation, when during a brake application the pressure of fluid in the brake cylinder device 4 and hence in the control chamber 67b of inshot valve device 10 is below the previously mentioned preselected low value, the latter device will assume an upper or open position under action of spring 67 on diaphragm 67a, in which position said diaphragm, acting through the medium of the pusher stem 54, will maintain the inshot valve 53 unseated from seat rib 58, and the cavity 64 of the combination stem and valve 62 will connect quick service volume 41 to passage 65, and the cavity 69 will connect the passage 70 to passage 17. When pressure of fluid in the brake cylinder device 4 and hence in the control chamber 67b of inshot valve device 10 exceeds the aforementioned preselected value, such pressure, acting on the diaphragm 67a, will cause the latter device to assume a lower or closed position, in which the valve 53 will be seated and the cavities 64, 69 will disestablish the respective connections just described. During brake release, the device 10 will remain in lower position until brake cylinder pressure has been reduced below the preselected low value.

One of the most important features of the invention is the comparative size of the chokes 66, 71 which replace the single choke heretofore interposed in the former structure between two certain passages; one of which lead from the service valve device to the inshot valve device and was constantly open to the brake cylinder device, and the other of which was constantly open to the pressure chamber of the charging valve device and was adapted to be opened or closed to the quick service volume according to whether the inshot valve device was in upper or lower position, respectively. This single choke was of compromise flow capacity, having to be large enough to permit fluid at brake pipe pressure to be vented at an acceptable, though not necessarily optimum, rate from the quick service volume to atmosphere during the initial phase of a brake application so as to assure reasonably prompt propagation of quick service activity throughout the train and also assure reasonably prompt movement of the service valve device to application position, despite brake pipe volume in the adjacent cars having no brake apparatus; yet small enough to restrict the rate of flow of fluid under pressure from the pressure chamber of the charging valve device to atmosphere so that after the inshot valve device returned to upper position during the final phase of a brake release and opened the quick service volume to said chamber, the charging valve device would be maintained in cut-off position for a period of time fixed by the size of said choke and the reduced brake pipe pressure. Thus the engineer could utilize the release position of the automatic brake valve device for only a safe, limited period of time, even though the brake release may not have been completed throughout the train at the expiry of such period.

The conflicting functions of this single choke are, in the improved brake apparatus, separately accomplished by the chokes 66, 71. Thus, choke 66 may be of any desired flow capacity, preferably greater than that of aforementioned single choke, which will more rapidly cause movement of the service valve device 9 to application position during the initial phase of a brake application yet will not cause an undesired overreduction in local brake pipe pressure beyond the extent necessary to propagate the quick service activity through intervening rearward unbraked cars to the next rearward brake-equipped car.

The choke 71, on the other hand, may be of any desired flow capacity, preferably lower than that of the aforementioned single choke, selected to so control the rate of venting of chamber 12 of charging valve device 7 and volume 46 to atmosphere, as to maintain the latter device in cut-off position for any desired period of time after the inshot valve device 10 has returned to upper position during the final phase of a brake release. It will be noted that, as in the previous structure, brake cylinder pressure in passage 27 acting back through choke 71 and passage 17 into chamber 12 of charging valve device 7 will maintain the latter device in cut-off position as long as such pressure is sufficient to overcome resistance of the light spring 18; that said spring is adapted to be overcome when pressure of fluid in said chamber is at or above some predetermined value, lower than the preselected value of brake cylinder pressure at which the inshot valve device 10 will move to lower position; and that pressure of fluid in said chamber must be permitted to eventually bleed down to atmosphere so as to cause said charging valve device to move to charging position for accomplishing the functions previously described.

Thus a flow capacity of choke 71 and size of storage volume 46 may be selected which on a long train or one having few brake-equipped cars will maintain the charging valve device 7 in cut-off position for such a period of time as will permit full utilization of the release position of the automatic brake valve device in effecting a more rapid, uniform brake release throughout the train.

*Operation*

In operation, assume that the brake apparatus has been initially charged in the same manner as described in the aforementioned copending application and that the handle of the aforementioned automatic brake valve device is now in running position.

Under this assumed condition, the brake pipe 1 will be charged to normal operating pressure in consequence of which the service valve device 9 will be in release position by virtue of substantial equalization of pressures of fluid in chambers 26, 28; the brake cylinder device 4 will be devoid of fluid under pressure by virtue of service valve device 9 being in release position; the inshot valve device 10 will be in upper position because the brake cylinder device 4 is devoid of fluid under pressure; the charging valve device 7 will be in charging position because the chamber 12 of the latter device is open to atmosphere by way of passage 17, choke 71, and passage 27 which is vented by virtue of the service valve device 9 being in release position; the quick service valve device 8 will be in normal position under action of spring 37 because the pressures of fluid in chambers 31, 33 are substantially equal by virtue of the device 7 being in charging position; and the volume 46 and quick service volume 41 will be open to atmosphere by way of the respective cavities 69, 64 of inshot valve device 10 and the respective chokes 71, 66 and branches of the vented passage 27. In consequence of this assumed condition, the various components will be in the respective positions in which they are shown in the drawing.

Assume now, that the handle of the automatic brake valve device is moved successively into service position and then into lap position after brake pipe pressure has been reduced to the desired extent, for thereby initiating a corresponding degree of service application of the brakes. As this reduction in brake pipe pressure is noted in passage 29 and hence in chamber 33 of the quick service valve device 8 of a brake-equipped car at the head of the train, said device will move to quick service position for thereby effecting a local reduction in brake pipe pressure by rapid charging of the quick service volume 41 on such car so that a so-called brake pipe reduction wave will be propagated rearward from such car, through the intervening cars without brake apparatus, to the next rearward brake-equipped car, where the operation will be repeated for further propagating said wave rearward to assure a relatively uniform, rapid initiation of a brake application throughout the train; it being noted that the quick service volume 41 is open to atmosphere by way of cavity 64, passage 65, choke 66, and the vented passage 27 for assuring that, irrespective of the number of such intervening cars without brake apparatus, the brake pipe pressure will be further reduced (after charging of volume 41) at the rate controlled by choke 66 for propagation of said wave, in the above manner, as well as assuring movement of the service valve device 9 to application position in the manner now to be described.

On each brake-equipped car, with the corresponding quick service valve device 8 in quick service position, fluid under pressure will also flow from the auxiliary reservoir 3 via passage 32 and past the unseated valve 47 to the passage 45 and volume 46, whence it will flow via passage 70 and the cavity 69 of inshot valve device 10 to passage 17. From passage 17 such fluid under pressure will flow to the chamber 12 of charging valve device 7, causing said device to move rapidly to cut-off position, for thereby terminating fluid pressure communication between the brake pipe 1, auxiliary reservoir 3 and control reservoir 5, as will be understood from previous description; and such fluid will also flow from passage 17, at a rate controlled by choke 71, to the vented passage 27.

When, by operation of the quick service valve device 8, brake pipe pressure in passage 29 and hence in chamber 28 of the service valve device 9 has been reduced to a sufficient extent, the latter device will move from release to application position by virtue of the effect of control reservoir pressure in chamber 26 overcoming the combined effects of such reduced brake pipe pressure in chamber 28 and the aforementioned bias spring. With the service valve device 9 in application position, fluid under pressure will flow from the auxiliary reservoir 3 to passage 27 and thence at a rapid rate through chamber 59 and past the unseated inshot valve 53 of inshot valve device 10 and thence by way of chamber 56 and passage 57 to the brake cylinder device 4, for causing a fast take-up of slack in the brake rigging. Since the inshot valve device 10 is in upper position, some fluid under pressure will also flow to passage 27 and hence brake cylinder device 4 by way of the quick service volume 41 and volume 46 at the rates controlled by the respective chokes 66, 71.

When the increasing pressure of fluid in the brake cylinder device 4, and hence in the control chamber 67b of the inshot valve device 10, exceeds the aforementioned preselected value the latter device will move to lower or closed position, by virtue of such pressure in chamber 67b being effective to deflect the diaphragm 67a against resistance of spring 67. In such position, the inshot valve 53 will be seated under action of spring 51, preventing further rapid charging of the brake cylinder device 4 by way of chamber 56, but permitting further charging of the latter device by way of chamber 59, passage 60, choke 61 and passage 57, at a rate controlled by said choke, in the same manner as set forth in the aforementioned copending application. And, in such lower position of the inshot valve device 10, the cavities 64, 69 will be so disposed as to terminate fluid pressure communication of the quick service volume 41 and volume 46, respectively, with the passage 27, as explained in previous description.

When the pressure of fluid in the brake cylinder device 4 has increased, at the rate controlled by choke 61, to an extent where the effect of such increasing brake cylinder pressure active in the aforementioned certain chamber of service valve device 9, combined with that of the aforementioned bias spring and reduced pressure of fluid in chamber 28, slightly overcomes the effect of control reservoir pressure in chamber 26, said service valve device will move to lap position, thereby cutting off further flow of fluid under pressure from the auxiliary reservoir 3 to the passage 27 and thus bottling up fluid under pressure in the brake cylinder device 4 and in the control chamber 67b of inshot valve device 10 and certain chamber of service valve device 9, which chambers are in constant communication with said brake cylinder device.

It is to be noted that fluid pressure in the passage 27 and chamber 12 of charging valve device 7 will equalize, through choke 71, for maintaining said device in cut-off position during a brake application.

Assume now that, in accordance with the usual practice, the engineer moves the handle of the aforementioned automatic brake valve device to release position for charging the brake pipe 1 with fluid at high pressure so as to initiate a rapid, uniform release of the brakes throughout the train.

As the pressure of the fluid in the brake pipe 1, and hence in passage 29 and in chamber 28 of the service valve device 9 increases, said device will move to release position, thereby opening passage 27 to atmosphere. Fluid under pressure will consequently be vented from the brake cylinder device 4 to atmosphere by way of the choke 61, the passage 60, chamber 59 of inshot valve device 10, and the vented passage 27; the latter device still being in lower or closed position in which inshot valve 53 is seated.

During this venting of the brake cylinder device 4, fluid under pressure flowing from the brake pipe 1 through passage 29 to chamber 33 of quick service valve device 8 will cause the latter device to return to normal position, thereby cutting off communication between the auxiliary reservoir 3 and volume 46 and between the brake pipe 1 and quick service volume 41, thereby bottling up fluid under pressure in the respective volumes 46, 41, since the inshot valve device 10 is still in lower position, as will be understood from previous description.

When pressure of fluid in the brake cylinder device 4 and hence in chamber 67b has been reduced in the above manner to less than the aforementioned preselected value, the inshot valve device 10 will, under action of spring 67 on diaphragm 67a, return to upper or open position, in which fluid under pressure in said brake cylinder device will be vented to atmosphere by way of passage 57, chamber 56, the unseated valve 53, chamber 59 and the vented passage 27. In such upper position, the cavity 64 will be so disposed as to cause hitherto bottled-up fluid under pressure in the quick service volume 41 to be vented to atmosphere through choke 66 by way of the vented passage 27; and the cavity 69 will be so disposed as to cause hitherto bottled-up fluid under pressure in the volume 46 to flow to passage 17 for maintaining the charging valve device 7 in cut-off position until the pressure of such fluid, bleeding to atmosphere by way of vented passage 27 at a rate controlled by choke 71, has reduced sufficiently to cause said charging valve device to move to charging position under action of spring 37; it being noted that prior to movement of the inshot valve device 10 to upper position, pressure of fluid in passage 27 was sufficient to maintain said charging valve in cut-off position.

It will now be observed that any desired flow capacity of choke 71 and cubic capacity of volume 46 may be selected for causing the charging valve device 7 to be maintained in cut-off position for any preselected period of time following movement of the inshot valve device 10 to upper position during the final phase of a brake release. Thus, taking into account the length of the train and number of cars thereof having brake equipment, a size of choke 71 and volume 46 may be selected which will assure that the handle of the automatic brake valve device may be maintained in release position long enough to effect a complete release, rapidly and uniformly, of the brakes throughout such a train without having undesired, intervening movement of the charging valve device 7 to charging position. After the brake release has been completed, the handle of the automatic brake valve device should be returned to running position within the period fixed by the selected size of choke 71 and volume 46, so as to prevent overcharging of the control reservoir 3.

With the aforementioned handle in running position and charging valve device 7 in charging position, the brake pipe 1, auxiliary reservoir 3 and control reservoir 5 will be in fluid pressure communication with each other, for thereby causing said auxiliary reservoir to be charged to brake pipe pressure and also causing equalization of pressure of fluid in said control reservoir with that in said brake pipe, as previously explained.

Assume now that the engineer moves the handle of the automatic brake valve device to emergency position for venting the brake pipe 1 to atmosphere at a rapid rate.

The quick service valve device 8 will promptly move to quick service position, causing fluid under pressure to be supplied to the quick service volume 41 and to the volume 46 in the manner previously described. Since the quick service valve device 8 will remain in quick service position throughout the brake application, the quick service volume 41 will remain open to the brake pipe and pressure of fluid in said volume will consequently reduce down to atmosphere by way of the vented brake pipe; whereas the pressure of fluid in volume 46 will not be substantially reduced because the pressure in the auxiliary reservoir 3 will not be drastically reduced during the emergency application of the brakes. Hence, there is no possibility of the charging valve device 7 moving first to cut-off position and then moving back to charging position before the inshot valve device 10 moves to lower position, as will be understood from previous description; and consequently no undesired reduction in pressures of fluid in the control and auxiliary reservoirs can occur during such brake application.

*Summary*

It will now be seen that the improved fluid pressure brake apparatus is adapted to cause a quick service reduction in brake pipe pressure at a preselected optimum rate during the initial phase of a brake application and to permit full utilization of the release position of the engineer's automatic brake valve device for rapidly and unformly releasing the brakes on the cars throughout the train by enabling the charging valve device to be maintained in cutoff position for any desired preselected period of time during the final phase of a brake release.

It will also be seen that an undesired reduction in pressures of fluid in the auxiliary and control reservoirs cannot occur even if the pressures of fluid in the brake pipe and quick service volume should be reduced to atmosphere before the inshot valve device moves to lower position during an emergency application of the brakes.

Having now described the invention, what I claim as new and desire to secure by Letters Patent, is:

1. In a fluid pressure brake apparatus of the type in which the degree of brake application and release is controlled according to the extent of reduction and restoration, respectively, of pressure of fluid in a brake pipe relative to that in a control reservoir, the combination of a charging valve device having a chamber and responsive to supply of fluid under pressure to said chamber to close off said brake pipe from said control reservoir and responsive to release of fluid under pressure from said chamber to open said brake pipe to said control reservoir, a communication through which fluid under pressure is conveyed for effecting a brake application and through which fluid under pressure is released for effecting a brake release, a volume for storing fluid under pressure, an auxiliary reservoir, first valve means responsive to a reduction in brake pipe pressure relative to an opposing pressure to supply fluid under pressure from said auxiliary reservoir to said volume, second valve means operative when pressure in said communication exceeds a chosen value to close off said volume from said chamber and when pressure in said communication is reduced below said chosen value to open said volume to said chamber, and choke means interposed between said communication and chamber, said choke means and volume being of such selected capacities as to defer opening of said brake pipe to said control reservoir via said charging valve device for a desired minimum period of time after fluid under pressure is released from said communication.

2. In a fluid pressure brake apparatus, the combination with a brake cylinder, a brake pipe, and a reservoir for storing fluid under pressure, of a brake cylinder communication via which fluid under pressure may be supplied to and released from said brake cylinder, a charging valve device having a control chamber and being responsive to release of fluid under pressure from said control chamber to open said reservoir to said brake pipe, a charging valve device control communication connected to the control chamber in said charging valve device for conveying fluid under pressure therefrom, first choke means connecting said charging valve device control communication with said brake cylinder communication for conveying fluid under pressure from the former to the latter at a restricted rate, a quick service communication through which fluid under pressure may be withdrawn locally from the brake pipe for a quick service reduction in brake pipe pressure, other choke means connecting said quick service communication to said brake cylinder communication for conveying fluid under pressure from the former to the latter at a restricted rate, and a service valve device operable to connect said brake cylinder communication to the atmosphere responsively to an increase in brake pipe pressure for releasing brakes.

3. In a fluid pressure brake apparatus of the type in which the degree of brake application and release is controlled according to the extent of reduction and restoration, respectively, of pressure of fluid in a brake pipe relative to that in a control reservoir, the combination of a charging valve device having a chamber and responsive to release of fluid under pressure from said chamber to open said brake pipe to said control reservoir and responsive to pressure of fluid in said chamber to close off said brake pipe from said control reservoir, brake applying means responsive to release of fluid under pressure for causing a brake release and responsive to supply of fluid under pressure for causing a brake application, a first communication leading to said chamber, a second communication through which fluid under pressure may be released locally from said brake pipe for effecting a quick service reduction in pressure therein, valve means responsive to a reduction in brake pipe pressure relative to an opposing pressure for supplying fluid under pressure to said first communication and opening said brake pipe to said second communication, first choke means interposed between said chamber and brake applying means for controlling at one selected rate flow of fluid under pressure therebetween, and second choke means in said second communication for controlling at another selected rate release of fluid under pressure from said brake pipe.

4. The combination according to claim 3, including other valve means operative so long as pressure in said brake applying means is below a preselected value to permit flow through said first communication and second communication and responsive to an increase in pressure in said brake applying means above said preselected value to interrupt such flow.

5. In a fluid pressure brake apparatus, the combination of a brake pipe, a reservoir, charging valve means responsive to release of fluid under pressure from a chamber for opening said brake pipe to said reservoir and responsive to pressure of fluid in said chamber for closing off said brake pipe from said reservoir, a quick service communication by way of which fluid under pressure may be locally released from said brake pipe, a second communication by way of which fluid under pressure may be supplied to said chamber, first choke means for controlling at one rate release of fluid under pressure from said brake pipe via said quick service communication, second choke means for controlling at another rate release of fluid under pressure from said chamber, second valve means having one position for interrupting flow of fluid under pressure through said quick service communication and second communication and another position for permitting such flow, and control means for controlling positioning of said second valve means.

6. The combination according to claim 5, including a volume for storing fluid under pressure, third valve means responsive to a reduction in brake pipe pressure relative to an opposing pressure for opening said quick service communication to said brake pipe and charging said volume with fluid under pressure from said reservoir, a brake controlling communication through which fluid under pressure is conveyed for effecting a brake application and from which fluid under pressure is released for effecting a brake release, and wherein said control means is controlled according to pressure in said brake controlling communication.

7. In a fluid pressure brake apparatus, in combination, a brake pipe, a reservoir, charging valve means responsive to release of fluid under pressure from a chamber to open said brake pipe to said reservoir and responsive to pressure of fluid in said chamber to close off said brake pipe from said reservoir, a brake controlling communication to which fluid under pressure is supplied upon a reduction in brake pipe pressure for effecting a brake application and from which fluid under pressure is released upon an increase in brake pipe pressure for effecting a brake release, a timing volume for storing fluid under pressure, second valve means responsive to a reduction in brake pipe pressure for charging said volume with fluid under pressure from said reservoir and responsive to an increase in brake pipe pressure for terminating such charging, choke means for permitting equalization at a controlled rate of fluid pressures in said chamber and communication, third valve means responsive to pressure of fluid in said communication to close off said volume from said chamber and responsive to release of fluid under pressure from said communication to open said volume to said chamber, said choke means and volume being of such selected capacities as to defer release of fluid under pressure from said chamber for a desired minimum period of time after release of fluid under pressure from said communication.

8. In a fluid pressure brake apparatus of the type comprising a valve device responsive to a reduction in pressure in a brake pipe relative to an opposing pressure in a control reservoir to supply fluid under pressure to a brake controlling communication for causing a brake application and responsive to an increase in brake pipe pressure relative to control reservoir pressure to release fluid under pressure from said communication for causing a brake release and further comprising a charging valve device responsive to release of fluid under pressure from a chamber to open said brake pipe to said control reservoir and responsive to pressure of fluid in said chamber to close off said brake pipe from said control reservoir, the combination of a volume for storing fluid under pressure, an auxiliary reservoir, first valve means responsive to a reduction in brake pipe pressure relative to auxiliary reservoir pressure to supply fluid under pressure to said volume from said auxiliary reservoir and responsive to an increase in brake pipe pressure relative to auxiliary reservoir pressure to close off said auxiliary reservoir from said volume, and choke means interposed between said communication and chamber for restricting rate of flow of fluid therebetween.

9. The combination according to claim 8, including second valve means responsive to release of fluid under pressure from said communication for opening said volume to said chamber.

10. In a fluid pressure brake apparatus, in combination, a brake pipe, an auxiliary reservoir, a control reservoir, charging valve means responsive to release of fluid pressure from a chamber to open said brake pipe to said auxiliary reservoir and control reservoir for equalizing pressures of fluid therein and responsive to supply of fluid under pressure to said chamber to close off said brake pipe from said auxiliary reservoir and control reservoir, brake applying means operable by fluid under pressure for effecting a brake application and responsive to release of fluid under pressure for effecting a brake release, a volume for storing fluid under pressure, a quick service communication through which fluid under pressure may be locally released from said brake pipe for effecting a quick service reduction in brake pipe pressure, second valve means responsive to a reduction in brake pipe pressure relative to auxiliary reservoir pressure to supply fluid under pressure from said auxiliary reservoir to said volume and also open said brake pipe to said quick service communication and responsive to an increase in brake pipe pressure relative to auxiliary reservoir pressure to close off said auxiliary reservoir from said volume and also close off said brake pipe from said quick service communication, choke means for permitting equalization at a controlled rate of fluid pressures in said chamber and brake applying means, third valve means operative so long as pressure in said brake applying means is less than a chosen value to open said volume to said chamber and also permit flow through said quick service communication and responsive to pressure in said brake applying means above said chosen value to close off said volume from said chamber and interrupt flow through said quick service communication.

11. The combination according to claim 10, wherein said quick service communication is open to said brake applying means, and including other choke means for restricting rate of flow of fluid under pressure through said quick service communication from said brake pipe to said brake applying means.

References Cited in the file of this patent
UNITED STATES PATENTS
1,936,966   Kasantzeff _____ Nov. 28, 1933